United States Patent [19]

Flaming

[11] Patent Number: 4,600,424
[45] Date of Patent: Jul. 15, 1986

[54] METHOD OF FORMING AN ULTRAFINE MICROPIPETTE

[76] Inventor: Dale G. Flaming, 2165-G Francisco Blvd., San Rafael, Calif. 94901

[21] Appl. No.: 714,537

[22] Filed: Mar. 21, 1985

[51] Int. Cl.[4] .............................................. C03B 23/11
[52] U.S. Cl. ........................................ 65/29; 65/108; 65/110
[58] Field of Search .................. 65/108, 29, 110, 270, 65/272

[56] References Cited

U.S. PATENT DOCUMENTS 4,523,938  6/1985  Grego .................................. 65/29 X
4,530,712  7/1985  Kopf ...................................... 65/270

Primary Examiner—Arthur Kellogg
Attorney, Agent, or Firm—Melvin R. Stidham

[57] ABSTRACT

A method of forming a micropipette by pulling one end of a glass tubing while the other end is held stationary. A portion of the tubing intermediate the ends thereof is heated and the viscosity of the glass is monitored by measuring the velocity at which the pulled end is moved. When a predetermined velocity is reached, indicating the material has softened sufficiently, the heating and pulling are both stopped. This process may be repeated until the desired pipette tip profile is achieved.

3 Claims, 1 Drawing Figure

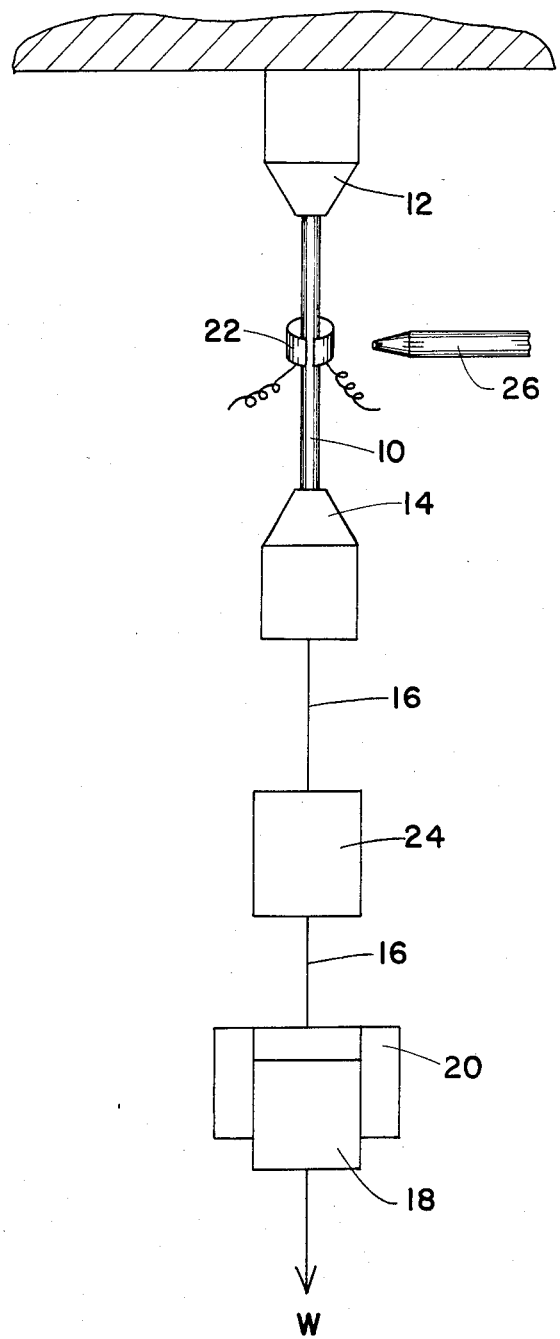

METHOD OF FORMING AN ULTRAFINE MICROPIPETTE

BACKGROUND OF THE INVENTION

Ultrafine micropipettes, with tip diameters of 0.1 micron and smaller, are required for penetration of extremely small animal cells for injection, electrophysiological study and the like. Such micropipettes may be formed by subjecting a heated length of glass tubing to an extremely light tensile load, usually less than one pound. According to one method this light tension is maintained until the glass tubing is extended in length by a predetermined amount. Then, after the heating element is cooled, the tubing was then subjected to a hard pull of up to 100 pounds to complete the ultrafine tip. This method is described in a commentary written by K. T. Brown and D. G. Flaming, the present inventor, and published in the Volume 2, 1977 issue of *Neuroscience* published by Pergamon Press (Great Britain). That method has worked satisfactorily for most purposes in producing the desired tip diameter. However, the extent of elongation of the glass tubing during the light pull, does not govern the ultimate taper and length of the micropipette tip achieved after the hard pull. While it is desirable to have only a slight taper at the tip in order to minimize animal cell distortion as penetration is advanced, there may be excessive electrical resistance in a tip that is too long. Moreover, the extreme flexibility of a long, thin tip may render it unsuitable for reaching target cells that are deeply buried.

OBJECTS OF THE INVENTION

It is an object of this invention to provide a method of forming an ultrafine micropipette that enables closer control of the taper and length of the tip.

It is a further object of this invention to provide a method of pulling a glass tubing to form a micropipette, wherein the time of the initial light pull varies with the increase in temperature of the glass tubing.

Other objects and advantages of this invention will become apparent from the description to follow, particularly when viewed in conjunction with the accompanying drawing.

BRIEF SUMMARY OF THE INVENTION

In accordance with this invention, a length of glass tubing is gripped at each end by a clamp or collet, at least one of which is capable of movement to pull the tubing along its axis. Heat is applied to a portion of the glass tubing intermediate the ends thereof and a light pull is applied to the movable clamp or clamps, causing a stretching and necking down of the glass tubing. Initially, the resultant taper is quite pronounced and then becomes more gradual and extended as the material softens. Accordingly, the increasing velocity (or derivative thereof) of the moving clamp is monitored closely during the light pull, as an indication of the decrease or rate of decrease of the viscosity of the glass medium. Then, when a predetermined value of velocity (or its derivative) is attained, the pulling and heating are stopped to avoid formation of a tip that is overly extended. This process may be repeated several times until the desired taper is produced and then, after heating is discontinued, the glass tubing is subjected to a hard pull to complete the micropipette.

BRIEF DESCRIPTION OF THE DRAWING

The drawing is a schematic diagram showing the method of this invention for pulling an ultrafine micropipette.

DESCRIPTION OF A PREFERRED EMBODIMENT

Referring now to the drawing with greater particularity, the method of this invention is there illustrated schematically. As shown, a length of glass tubing is gripped firmly at each end by a grip or collet 12 and 14, either or both of which may be movable. For purposes of illustration, the grip 12 is shown as stationary while the grip 14 is pulled axially by a cable 16.

Glass tubing used for this purpose may be about 1 mm in outer diameter and 0.5 mm in inner diameter and may be made of a heat resistant glass such as "Pyrex." In operation, the movable grip 14 is pulled downward by a constant load W, which may be carried on the cable 16, to produce a light tension in the order of about one-half pound force. In practice, the load W may be provided by the weight of a plunger 18 of a solenoid 20.

As the glass length 10 is being so pulled, a portion thereof intermediate the ends is heated, as by electrical heating element 22.

As the heating and pulling continue, the glass material is softened and there is a progressive reduction in viscosity. Accordingly, there is a decrease in the resistance to pull and an increase in the velocity with which the end of the glass tubing 10 is pulled by the movable gripper 14. This velocity is monitored as by means of a velocity transducer 24 that measures the rate of movement of the cable 16 to which the weight W is attached.

As the velocity of the pull increases, there is a decrease in the taper of the tip, and the tip profile becomes more nearly parallel. Hence, the profile of the tip formed during the initial pull is governed more by viscosity of the material than by amount of elongation. The operator may wish to limit the length of the tip for reasons stated above and, therefore, may elect to discontinue pulling and heating when the viscosity drops to a level wherein the elongation to be produced thereafter may be excessive. Hence, when the velocity of the weight W and cable 16 reaches a predetermined level the weight W is otherwise supported to relieve tension on the cable 16. The heating element 22 is then cooled, as by directing a jet of gas, such as nitrogen, through nozzles 26 against the element 18.

If the tip of the tubing 10 is not reduced to the desired diameter, the process may be repeated and the weight W is again allowed to pull on the cable 16 as the heating element 18 is energized. This will neck the tubing 10 down further, first at a relatively sharp taper and then at a more gradual taper as viscosity is again reduced.

It is to be understood that, while the method of this invention is applicable to the formation of ultrafine micropipette tips, it is not so limited and may be applied to the formation of tips that are somewhat larger.

Finally, when the tubing 10 is reduced to near the desired tip diameter, the heating element 18 is again cooled and the tubing 10 is subjected to a hard pull, say in the order of 75 to 100 pounds force, wherein the tip is completed and the glass tubing 10 is severed.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. The method of forming a micropipette comprising the steps of:

prov020iding a length of glass tubing;

grasping said length of tubing at opposite ends thereof;

applying heat to a portion of said tubing intermediate said opposite ends and pulling said opposite ends apart under constant light tensile load;

measuring the instantaneous velocity of a moving end of said tubing as an indication of the viscosity of the glass at said portion of the tubing; and interrupting the application of heat and the pull when the instantaneous velocity reaches a predetermined level.

2. The method defined by claim 1 wherein:

one end of said tubing is held stationary and the other end is pulled longitudinally; and the velocity of said other end is measured as an indication of viscosity of the glass;

the pull being ceased when said velocity reaches a predetermined level.

3. The method defined by claim 2 including the further steps of:

again applying heat to said porton of the tubing and pulling said other end while measuring the velocity of said other end; and relieving tension on said tubing when said velocity reaches a certain level.

* * * * *